United States Patent [19]

Ginsberg

[11] Patent Number: 4,489,369
[45] Date of Patent: Dec. 18, 1984

[54] CONTROL CIRCUIT FOR A FLYBACK STEPCHARGER

[75] Inventor: Howard S. Ginsberg, Baltimore County, Md.

[73] Assignee: The United States of America as represented by the Secretary of the Navy, Washington, D.C.

[21] Appl. No.: 508,691

[22] Filed: Jun. 28, 1983

[51] Int. Cl.³ .......................................... H02M 3/335
[52] U.S. Cl. ...................................... 363/21; 363/49; 363/79; 363/97
[58] Field of Search ...................... 363/18, 19, 20, 21, 363/27, 28, 49, 79, 80, 97; 323/901

[56] References Cited

U.S. PATENT DOCUMENTS

| | | | |
|---|---|---|---|
| 3,364,391 | 1/1968 | Jensen | 361/101 |
| 3,706,890 | 12/1972 | Clements et al. | 307/225 |
| 3,819,955 | 6/1974 | Hilbert | 307/225 |
| 4,076,974 | 2/1978 | Gee | 363/19 |
| 4,272,806 | 6/1981 | Metzger | 363/21 |

Primary Examiner—William M. Shoop
Assistant Examiner—Jeffrey Sterrett
Attorney, Agent, or Firm—Robert F. Beers; William T. Ellis; Charles S. Guenzer

[57] ABSTRACT

A control circuit for a flyback stepcharger comprising a source producing a current proportional to a power supply output in order to charge a capacitor. When the capacitor reaches a predetermined level the charging stops and switching transistors to the primary of the transformer of the stepcharger are turned on. When the primary current reaches another predetermined level the switching transistors are turned off. The source charging the capacitor is restarted a set time after the switching transistors are turned on. The stepcharging is terminated when the DC voltage of the power supply output reaches its set value as measured when the switching transistors are on.

7 Claims, 5 Drawing Figures

CONTROL CIRCUIT FOR A FLYBACK STEPCHARGER

BACKGROUND OF THE INVENTION

1. Field of the Invention

The field of the invention is generally electrical control circuits and in particular control circuits for a power supply.

2. Description of the Prior Art

There is an increasing usage of modular solid-state RF (radio frequency) power amplifiers in driver and output stages of pulsed radar transmitters. These RF amplifiers can be simply high frequency transistors. These transistors require input power at relatively low voltages of 25 to 50 volts but at relatively large currents. These requirements contrast with those for microwave tube transmitters which involve kilowatts of input voltage but at relatively low currents.

In order to minimize voltage droop at the input to these solid-state RF amplifiers a large amount of capacitance is usually placed locally in each RF amplifier module. It is these capacitors which provide power for the RF amplifiers during the short RF transmit pulse. The voltage on these capacitors will droop about one or two volts during the RF pulse. It is the function of the power supply to recharge these capacitors (during the radar inter-pulse period) back to their original voltage before the next RF pulse. The pulse-to-pulse tolerance on this voltage is determined by the radar performance requirements and the RF phase allocation of the radar system. Thus the power supply can be looked at as a capacitor charger and not as a normal DC supply.

In many applications, it is desirable to minimize the size and weight of the power supply. Therefore large and heavy 60 Hz transformers were displaced by off-line switching type power supplies. One such power supply is the series flyback stepcharger shown in schematic representation in FIG. 1. This power supply is the subject of a patent application of this inventor and other filed Aug. 11, 1982, Ser. No. 407,239, herein incorporated by reference. This power supply operates from a three phase, 60 Hz, 440 $VAC_{L-L}$ prime power system entering the power supply on the three AC lines 10, 12, and 14. With such a power supply, the rectified input is 650 VDC which is beyond the 450 V limitations of $V_{ceo}$, the collector-to-emitter breakdown voltage with open-circuited base, in presently available transistors. This problem is circumvented by putting in series three identical but separate flyback inverter switch sections 20, 22, and 24. The outputs of all the sections are combined through separate primaries or primary windings 26, 28 and 30 of the inverter output transformer 32, into a single secondary 34. The secondary 34 supplies current through a rectifying diode 36 to a load capacitor 38 which serves as the local DC power supply for a time varying load put across the leads of the load capacitor 38. The power supply serves to recharge the load capacitor 38 after it has been partially discharged by the pulsing of the RF amplifier.

The stepcharger drives the RF amplifiers directly with no series regulator disposed therebetween. The operation of the flyback stepcharger is controlled by six switching transistors 40, 42, 44, 46, 48 and 50, two per serial section 20, 22 or 24. Because of the series, none of the transistors 40–50 are exposed to the full 650 VDC.

The control circuitry required to control the switching transistors 40–50 presents several unique problems. Fine regulation is required to provide the pulse-to-pulse stability for radars, particularly those of the MTI type. Because the stepcharger operates as a flyback switch which induces current in the secondary when the primary current is turned off by the switching transistors 40–50, the secondary output current starts at a peak that may reach 200A before linearly decreasing to zero. Even a couple milliohm wire resistance to the load capacitor 38 introduces 400 mV variation in output voltage if measured close to the secondary. Regulation to 20 mV is difficult when a 400 mV ripple exists on the DC line.

It is desirable to let the secondary current decrease to zero before the switching transistors 40–50 are turned on for the next cycle. This procedure both reduces stress on the transistors and also maximizes the transfer of energy from the primary to the secondary. If the peak current on the primary is kept constant, then the discharge time of the secondary is inversely proportional to the voltage across the load capacitor. Thus the discharge time of the flyback stepcharger must change for at least three occasions when the output voltage is changed: (1) during initial power supply turn-on; (2) after an output overload when the load capacitor 38 is excessively discharged; and (3) when a different output voltage is desired. The last occasion arises when control of the output voltage is used to control the RF output power.

SUMMARY OF THE INVENTION

Accordingly it is an object of this invention to provide a control circuit for a flyback stepcharger.

It is a further object of this invention to provide a control circuit for a flyback stepcharger that is efficient and imposes minimum stress upon its components.

It is yet a further object of this invention to provide a control circuit which precisely and flexibly regulates a flyback stepcharger.

The invention is a control circuit for a flyback stepcharger comprising a timing circuit generating a pulse after a delay inversely related to the DC voltage monitored on the stepcharger output, and an enabling circuit activated after the delay for turning on the switching transistors to the primary of the stepcharger's transformer, but which is disabled after the current in primary reaches a predetermined limit. The timing circuit is reinitiated a set time after the delay period has ended. The enablement of the switching transistors is prevented when the voltage of the stepcharger has reached another predetermined limit as measured during the time no current flows in the secondary of the transformer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
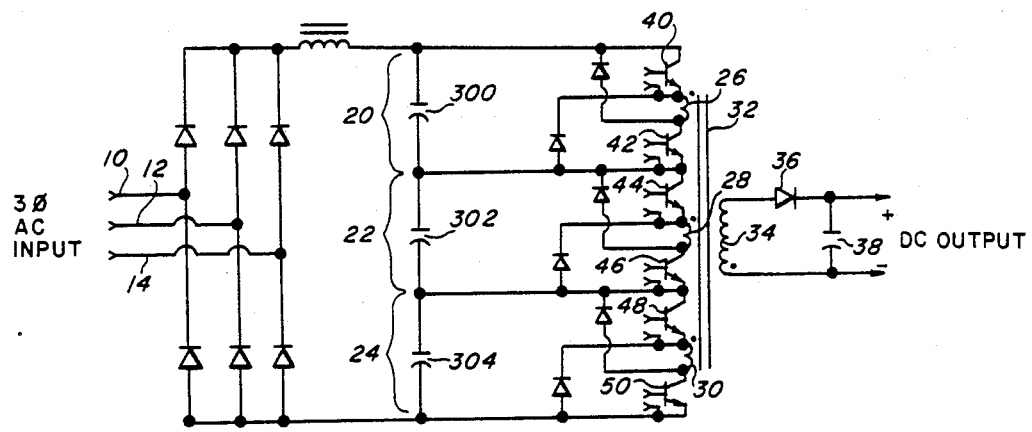
FIG. 1 is a schematic representation of the circuitry of a series flyback stepcharger.
Figure 2:
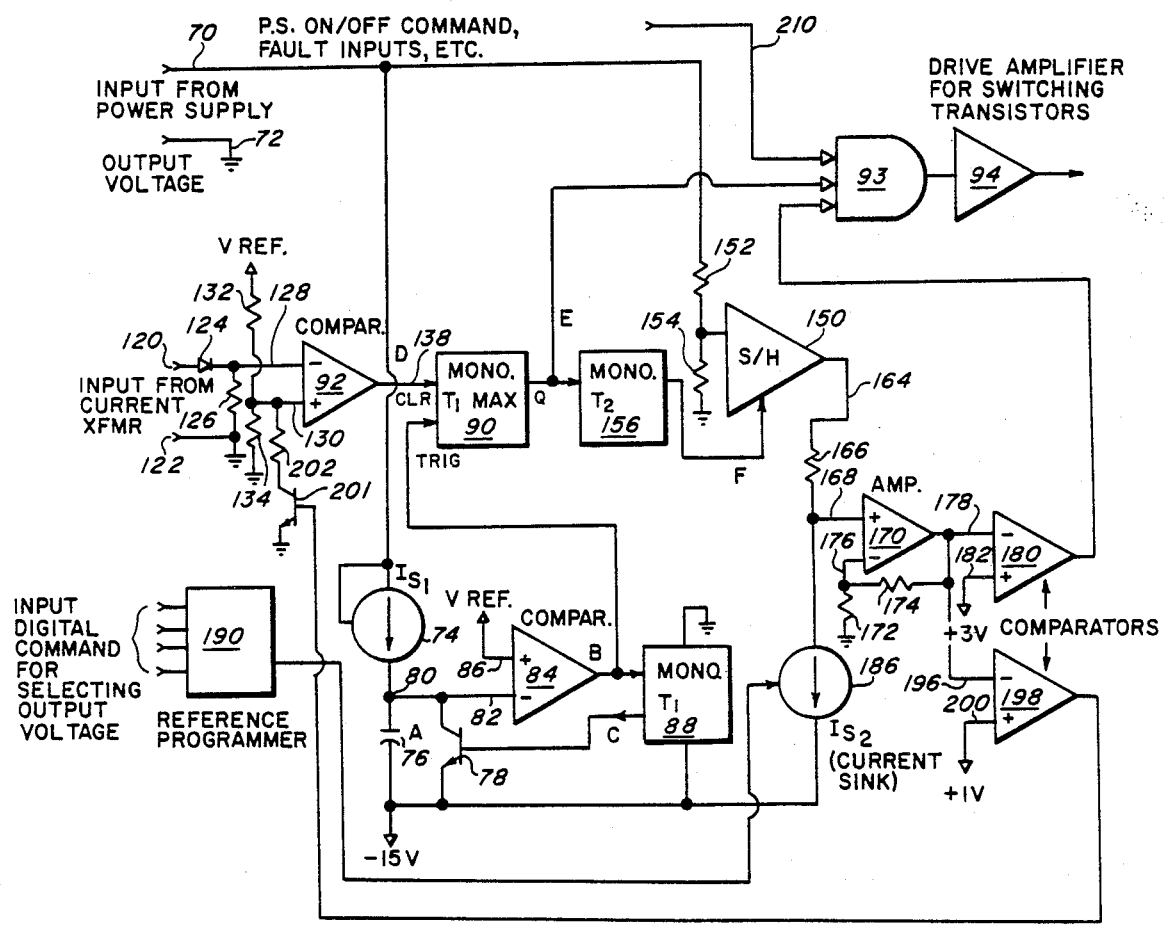
FIG. 2 is a general schematic representation of a control circuit for a flyback stepcharger.

Referring now to the drawings, wherein like reference numerals designate identical or corresponding part throughout the several views, and more particularly to FIG. 2 thereof, dual voltage inputs 70 and 72 are connected to the power supply output, i.e. at some point beyond the rectifying diode 36 of FIG. 1, and monitor the voltage across the load capacitor 38 (shown in FIG. 1). One voltage input 72 shown in FIG. 2 is connected to local ground while the other input 70 serves as the DC output voltage monitor for the control circuits. A voltage proportional current source 74 is connected on one side to the voltage input 70 and its current output is proportional to the voltage on the input 70. Its internal impedance is high enough so as not to pull the monitor voltage on input 70. The current from the current source 74 charges a timing capacitor 76 when a shorting transistor 78 is turned off. As a result the voltage at point 80 rises linearly with time with a slope proportional to the power supply output voltage. That point 80 is monitored on the negative input 82 of a comparator 84 for which the positive input 86 is kept at a fixed voltage $V_{REF}$. Thus when after a delay time the voltage at point 80 exceeds $V_{REF}$, then comparator changes state and triggers monostables 88 and 90 which act as pulse generators. The length of the delay time will be inversely proportional to the voltage across the power supply output. Both monostables 88 and 90 have output pulsewidths of $T_1$ which was chosen to be 66 microseconds. Monostable 88 thus causes the shorting transistor 78 to prevent the charging of the capacitor 76 for $T_1$, i.e. until the start of the next step. However the length of time between initialization of the charging of the timing capacitor 76 is $T_1$ plus the delay time so that the period decreases as the power supply output voltage increases.

The other monostable 90 produces a pulse having a maximum pulse width of $T_1$; however, the pulse is usually shortened by a CLEAR from the primary current comparator 92 to be described somewhat later. The output of the monostable 90 is led to one of the inputs of an AND gate 93. If the other inputs to the AND gate 93 are enabling it, the pulse of the monostable 90 will pass through a drive amplifier 94 to the bases of all six switching transistors 40–50 of the flyback stepcharger of FIG. 1, thus allowing current to flow through the primaries 26, 28, and 30.

It should be noted that a flyback stepcharger can be built with a single section 20 and the control circuit of this invention can control that section 20. In order to simplify the following discussion, only the single stepcharger section 20 will be considered.

Figure 3:
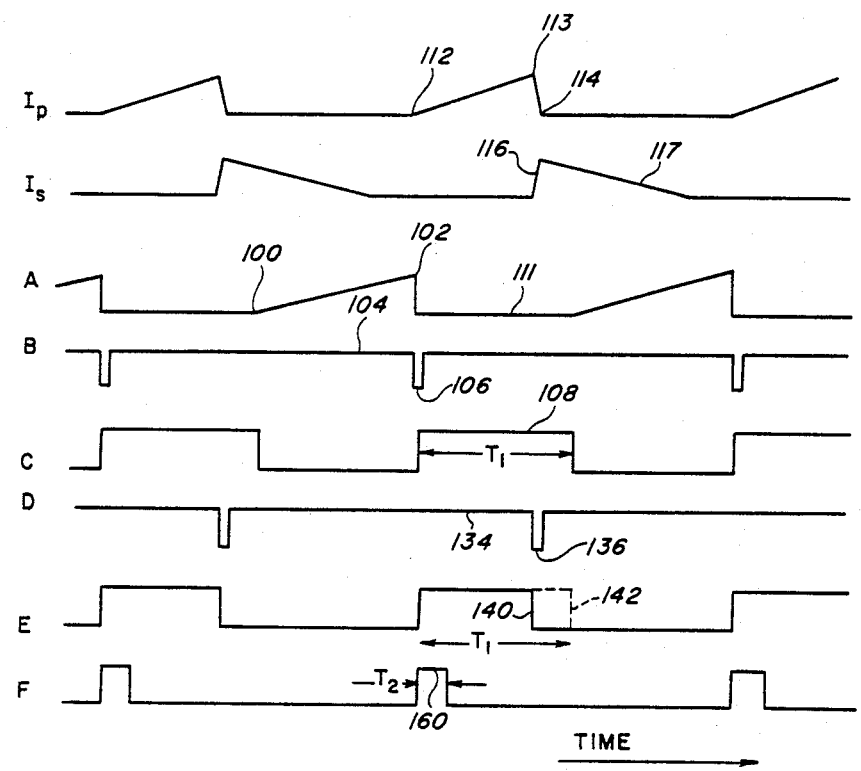
FIG. 3 is a waveform diagram for various currents and voltages appearing at points of the control circuit of FIG. 2 as a function of time.

The waveforms for various currents and voltages are represented in the timing diagram of FIG. 3 which gives the currents and voltages as a function of time at labelled points for several stepcharging periods of the load capacitor 38.

The voltage waveform A for the capacitor 76 at point 80 begins at zero at point 100 in FIG. 3 and linearly increases with time until it reaches $V_{REF}$ at point 102. Thereupon the output of the comparator 84 changes from a HIGH 104 to a LOW 106 as shown in trace B. This transition triggers the monostable 88 to produce a positive pulse 108 shown in trace C of duration $T_1$. During the time the output of monostable 88 is HIGH, the shorting transistor 78 keeps the voltage across the timing capacitor 76 at zero 111 shown in trace A. The transition on the comparator 84 also triggers the monostable 90, thus enabling the switching transistors 40 and 42 and causing current to begin flowing through the primary 26. In a flyback stepcharger, the primary current rises linearly from zero 112 shown in trace $I_p$. The primary current is limited to a maximum value 113 by a limiting control circuit to be described later which disables the switching transistors 40 and 42. After the switching transistors 40 and 42 are turned off the primary current quickly falls to zero 114. This quick transition or switch in the primary induces a corresponding rise 116 as shown in trace $I_s$ for the secondary current. After the switch the secondary current in a stepcharger linearly decreases to zero as shown by slope 117. The length of the secondary current decay time will depend on the maximum value 113 of the primary current at the time of the switch, the inductance of the transformer secondary 34, and the output voltage.

The limiting control circuit relies on a monitoring current transformer, not shown, connected to the primary 26. The outputs of the monitoring transformer are connected to inputs 120 and 122 shown in FIG. 2 the second of which is grounded. The combination of diode 124, and resistor 126 between the other input 120 and ground rectifies the monitoring transformer signal for the negative input 128 of the comparator 92. The positive comparator input 130 is connected to the junction of two resistors 132 and 134 in series between a reference voltage and ground. Thus when the primary current reaches the maximum value 113 corresponding to the voltage at the comparator's positive input 130 the comparator 92 changes state from a HIGH 134 to a LOW 136 as shown on trace D of FIG. 3. This transition fed into the CLEAR input 138 shown in FIG. 2 of the monostable 90 causes the monostables's pulse to terminate as shown by the transition 140 of trace E in FIG. 3 at a time less than the $T_1$ edge 142 of the maximum length pulse. The end of the pulse causes the AND gate 93 shown in FIG. 2 to turn-off the switching transistors 40 and 42 so in fact the primary current is limited to its maximum value.

The control circuitry described heretofore controls the size of each step in the stepcharging process. Further control circuitry is required to stop the stepcharging when the load capacitor 38 of FIG. 1 is fully charged. This voltage is monitored on the voltage input 70 shown in FIG. 2 and is fed to a sample-and-hold circuit 150 properly isolated by two resistors 152 and 154. The pulse of maximum length $T_1$ from monostable 190 also triggers monostable 156 which thereby outputs a pulse 160 of width $T_2$ shown in trace F of FIG. 3. This pulse 160 enables the sample and hold 150 shown in FIG. 2 which samples the voltage on the load capacitor 38 during the pulse 160 and then holds this voltage on its output 164 until the next sample period. By comparison of traces $I_s$ and F in FIG. 3 it can be seen that the sample-and-hold 150 samples the secondary while the secondary current is zero. Thus noise and resistive drop associated with large secondary currents are avoided. However this condition is met only if the decay time on the secondary current is short enough. If the peak primary current is kept constant, then the decay time on the secondary current is inversely proportional to the output voltage on the load capacitor 38. Because this voltage is inversely proportional to the delay in charging the capacitor 76 shown in FIG. 2 by the voltage proportional current source 74, the length of a stepcharging period varies directly with the time needed for the secondary current to decay. This condition also prevents the switching transistors 40 and 42 from being turned on while secondary current is still flowing.

The sampled voltage is held on line 164 and after dropping across resistor 166 is led into the positive input 168 of an operational amplifier 170. Resistors 172 and 174 connected to the negative input 176 control the amplification. The output of the amplifier 170 is led to the negative input 178 of a comparator 180 which is referenced to a fixed voltage, here 3 V, on its positive input 182. When the output of amplifier 170 exceeds 3 V, the output of the comparator 180 changes state to a LOW thereby negating the AND gate 93 and turning off the switching transistors 40 and 42 to primary 26. The 3 V level thus corresponds to the maximum voltage on the load capacitor 38 with the correspondence being controlled not only by the amplification of the sample-and-hold 150 and the amplifier 170 but also by the amount of current being drawn through the resistor 166 by a programmable current source 186 that acts as a sink for the current from the sample-and-hold 150. A digital command input to a reference programmer 190 will change the current drawn by the programmable current source 186 that affects the voltage drop across resistor 166 thus controlling the final voltage on the load capacitor 38.

Additional circuitry controls the size of the steps in which the load capacitor 38 is charged whereby the final voltage limit is approached in smaller steps and overshoot is avoided. The output of amplifier 170 is also fed to the positive input 196 of a comparator 198. The negative input 200 is referenced to a voltage, here 1 V, that is lower than the reference voltage on the positive input 182 of comparator 180. As the voltage on the load capacitor 38 rises, the comparator 198 changes state. Its output is connected to the base of a transistor 201. The emitter of this n-type transistor 201 is grounded and a resistor 202 is connected between the collector of the transistor 201 and the positive input of the primary current comparator 92. The resistance of resistor 202 is comparable to or less than that of resistor 134 so that when the comparator 198 turns on transistor 201, the voltage reference to the primary current comparator 92 is reduced. Thus the maximum value 113 of the primary current shown on trace $I_p$ of FIG. 3 is reduced as the voltage on the load capacitor 38 approaches its final value.

An additional input 210 of the AND gate 93 is used for ON/OFF commands, fault conditions, and the like to disable the stepcharger.

Figure 4:
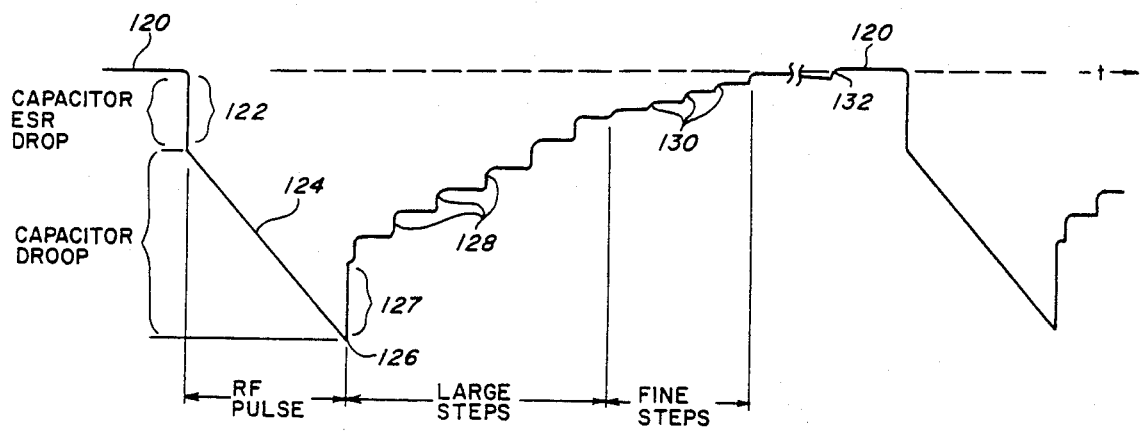
FIG. 4 is a waveform diagram for the voltage output of a flyback stepcharger as controlled by the circuitry of FIG. 2 as a function of time.

The voltage across the load capacitor 38 is shown as a function of time in FIG. 4. The fully charged capacitor 38 has a maximum voltage 120. When the RF module draws current from the capacitor 38, because of the large current involved there is a substantial voltage drop 122 across an equivalent series resistance. As the RF module draws on the load capacitor 38 it discharges with a linear slope 124 until the RF module ceases drawing at the minimum voltage 126 of the load capacitor 38. With the cessation of current, the equivalent series resistance 127 disappears. Thereafter the load capacitor 38 is recharged in a series of large steps 128 followed by a series of small steps 130 until the maximum voltage 120 is reached at which point the the charging stops. Each step 128 or 130 represents one period of the stepcharger. If small amounts of charge leak off the load capacitor 38, a single small step 132 will bring the voltage up to the maximum value 120.

Only one of the control circits hitherto described has been used for the series flyback stepcharger shown in FIG. 1. Ideally the currents in each of the primaries 26, 28, and 30 are equal so that only one section 26 needs to be monitored while the switching transistors 40-50 for all three sections 20, 22, and 24 are controlled. However, the aluminum electrolytic capacitors 300, 302, and 304 across the separate sections have large variations in capacitance, typically +50%, −10%. If the current monitor were placed on the low voltage section, dangerously high currents can be developed on the high voltage sections, particularly at initial turn on of the power supply. This problem can be eliminated by using separate current monitor transformers on each of the sections 20, 22, and 24. The outputs of the separate disabling circuits are then combined in an OR gate to prevent further charging when the current in any of the primaries 26, 28, or 30 exceeds the predetermined limit.

Figure 5:
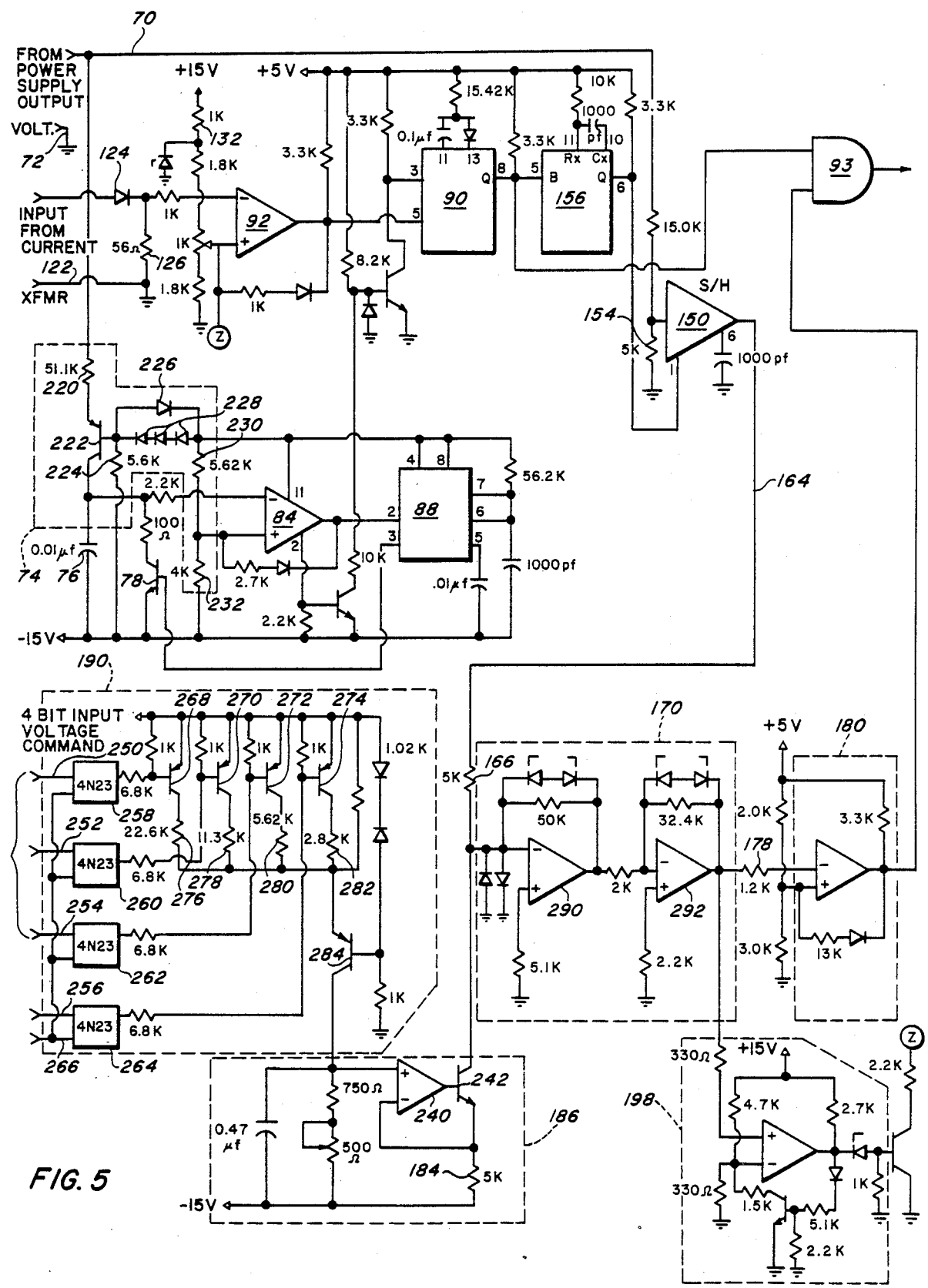
FIG. 5 is a detailed schematic representation of the control circuit of FIG. 2.

The control circuit shown in general schematic representation in FIG. 2 has been built according to the detailed schematic representation shown in FIG. 5.

The voltage proportional current source 74 comprises a larger resistor 220 between the monitor voltage input 70 and the emitter of a p-type transistor 222. The base of the transistor 222 is separated from −15 V by a smaller resistor 224 in parallel with a clipper circuit comprising opposed diodes 226 and 228 and resistors 230 and 232. The comparator 84 comprises an LM 111 and associated biasing circuitry. The monostable 88 is a 555 and associated biasing circuitry. The monostable 90 on the other hand is a 54LS122 and associated circuitry. And monostable 156 is a 54121 and associated circuitry. The AND gate 92 is a 54LS15. The sample-and-hold 150 is an LF198H.

The programmable current source 186 is an operational amplifier 240, a 741, driving the base of a transistor 242 and associated biasing and feedback circuitry. The programmable current source 186 is controlled by the reference programmer 190 built according to the following plan. A four-bit voltage input command is fed on four parallel lines 250, 252, 254 and 256 to four parallel optical couplers 258, 260, 262, and 264, each a 4N23. The outputs of the couplers 258, 260 262, and 264 drive the bases of separate but parallel drive transistors 268, 270, 272, and 274 to the collectors of which are connected resistors 276, 278, 280 and 282. The resistances are chosen to precisely vary by a factor of two from resistor to resistor. The currents are combined to drive the emitter of a transistor 284, the collector of which is fed to the programmable current source 186. This combination of reference programmer 190 and programmable current source 186 can control the DC output voltage between 24 and 40 V, thereby controlling the RF output.

The amplifier 170 is a two stage operational amplifier 290 and 292, both stages contained in a 747 and associated biasing and feedback circuitry. The comparators 180 and 198 are both contained in a single integrated circuit, a LH2111, and they use additional biasing, feedback and output circuitry.

The flyback stepcharger control circuit built according to this invention for a 40 V, 41A power supply ignores the ripple on the power supply output by sensing the output voltage only during the "on" time of the switching transistors when the current in the secondary is zero. The control circuit automatically adjusts the "off" time of the flyback switching transistors according to the power supply output voltage. This ensures complete transfer of the flyback transformer energy on each cycle, allows relatively large commanded changes in the power supply output voltage, and protects the switching transistors during the output short circuit condition. Furthermore the control circuit providing the regulation of the flyback stepcharger is an open loop system, when the switching transistors are either on or off, and thus avoids the stability problems of closed loop systems. In addition the control circuit can be built to provide smaller output steps as the power supply output voltage approaches its final value by reducing the peak current allowed on the primary of the flyback transformer. A reduction of primary peak current by a factor of two reduces the size of the DC voltage step by a factor of four because not only are the currents halved but also the decay time of the current into the inductive load is halved. This fine tuning eliminates the need for a series or a shunt regulator at the output of the power supply if the load capacitor were instead overcharged.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A control circuit for a power supply, comprising:
   a transformer having a primary and a secondary, said secondary powering a load connected across the secondary;
   a switching transistor for powering the primary of said transformer;
   a timing circuit for producing a delay after receiving an initialization signal, said timing circit varying said delay inversely as the electrical signal across said load, said timing circuit receiving a reinitializing signal a set time after the end of said delay;
   an enabling circuit for enabling on said switching transistor after said delay;
   a first disabling circuit for disabling said switching transistor when the current on the primary reaches a predetermined primary limit;
   a second disabling circuit for disabling said switching transistor when the electrical signal across said load exceeds a predetermined load limit after said switching transistor has been enabled by the enabling circuit and disabled by the first disabling circuit.

2. A control circuit for a power supply, as recited in claim 1 wherein:
   said electrical signal across said load is a load voltage; and
   said timing circuit comprises:
   a current source producing a current substantially proportional to said load voltage;
   a capacitor being charged by said current source; and
   comparison means for generating a signal when the voltage on said capacitor reaches a predetermined capacitor voltage limit.

3. A control circuit for a power supply, as recited in claim 2, wherein said first disabling circuit includes means for decreasing the predetermined primary limit as the electrical signal across said load approaches said predetermined load limit.

4. A control circuit for a power supply, as recited in claim 1, wherein said first disabling circuit includes means for decreasing the predetermined primary limit as the electrical signal across said load approaches said predetermined load limit.

5. A control circuit for a power supply, comprising:
   a transformer having a primary and a secondary, said secondary powering a capacitive load connected across the secondary;
   a switching transistor for powering the primary of said transformer;
   a capacitor for timing;
   a current source for charging said timing capacitor by means of a current proportional to the output of the power supply;
   comparison means for comparing the voltage across said capacitor to a timing limiting voltage and discontinuing the charging of the timing capacitor for a set time period when the voltage reaches the timing limiting voltage;
   first means for enabling the switching transistor when the voltage on the timing capacitor reaches the timing limit voltage and for disabling the switching transistor when the current in the primary reaches a primary limiting current;
   second means for disabling the switching transistor when the voltage on the power supply output reaches an output limiting voltage that is measured between the enabling point when the timing capacitor reaches the timing limiting voltage and disabling point when the current in the primary reaches the primary limiting current.

6. A control circuit for a power supply, as recited in claim 5, wherein the second disabling means includes means for decreasing the primary limiting current when the voltage on the power supply output exceeds a fine tuning limiting voltage that is less than the output limiting voltage.

7. A method of controlling a stepcharger comprising:
   receiving an initialization signal;
   enabling a switching transistor powering a primary of a transformer of the stepcharger after a delay following the initialization signal, said delay being for a time inversely related to the voltage on an output of the stepcharger;
   disabling the switching transistor when the current in the primary reaches a primary limiting current;
   measuring the voltage on the output of the stepcharger, between the time of emabling and disabling; and
   further disabling the switching transistor if the measured voltage exceeds an output limiting voltage; and
   generating another initialization signal.

* * * * *